United States Patent
Rong et al.

(10) Patent No.: US 7,911,945 B2
(45) Date of Patent: Mar. 22, 2011

(54) APPARATUS AND METHOD FOR EFFICIENTLY SUPPORTING VOIP IN A WIRELESS COMMUNICATION SYSTEM

(75) Inventors: Zhigang Rong, Irving, TX (US); Lin Ma, Irving, TX (US); Steven Craig Greer, Rowlett, TX (US); Zhigang Liu, Irving, TX (US); Zhouyue Pi, Irving, TX (US)

(73) Assignee: Nokia Corporation, Espoo (FI)

( * ) Notice: Subject to any disclaimer, the term of this patent is extended or adjusted under 35 U.S.C. 154(b) by 1270 days.

(21) Appl. No.: 10/918,542

(22) Filed: Aug. 12, 2004

(65) Prior Publication Data

US 2006/0034340 A1   Feb. 16, 2006

(51) Int. Cl.
*G08C 15/00* (2006.01)
(52) U.S. Cl. ........ 370/230; 370/235; 370/317; 370/342; 370/401; 370/477
(58) Field of Classification Search .................. 370/229, 370/230, 230.1, 342, 352–356, 346, 252, 370/401, 317, 516, 201, 231, 235, 268, 269, 370/286–292, 349, 477; 704/201; 375/254, 375/346; 455/67.13, 114.2, 222, 223, 278.1, 455/283, 296–299, 501, 570; 379/392.01
See application file for complete search history.

(56) References Cited

U.S. PATENT DOCUMENTS

| | | | | |
|---|---|---|---|---|
| 5,615,214 | A | 3/1997 | Chandos et al. | 370/349 |
| 5,897,613 | A * | 4/1999 | Chan | 455/570 |
| 6,285,682 | B1 * | 9/2001 | Proctor et al. | 370/465 |
| 6,366,880 | B1 * | 4/2002 | Ashley | 455/570 |
| 6,381,568 | B1 * | 4/2002 | Supplee et al. | 704/210 |
| 6,438,131 | B1 | 8/2002 | Gerber et al. | 370/395 |
| 6,665,317 | B1 * | 12/2003 | Scott | 370/516 |

(Continued)

FOREIGN PATENT DOCUMENTS

WO   WO-2005/099190 A1   10/2005

OTHER PUBLICATIONS

Nippon Telegraph & Telephone et al., Patent Abstract of Japan, "Voice Packet Transmitting/Receiving Device", JP 10285212 A, Oct. 23, 1998.

(Continued)

*Primary Examiner* — Kwang B Yao
*Assistant Examiner* — Jeffrey M Rutkowski
(74) *Attorney, Agent, or Firm* — Harrington & Smith

(57) ABSTRACT

The present invention concerns methods for efficiently supporting Voice over Internet Protocol (VoIP) on the Forward Packet Data Channel (F-PDCH) in CDMA 2000 1xEV-DV systems. Active speech in VoIP is encoded using, for example enhanced variable rate codec (EVRC), which produces 171, 80 and 16 bits per 20 ms of speech for Rate 1, Rate ½ and Rate ⅛, respectively. However, about 60% of the time a user is inactive during a speech session, so an inordinate amount of system bandwidth is comprised of rate ⅛ VoIP packets. In one embodiment of the present invention the apparatus of the present invention identifies the Rate ⅛ voice frame packets and discards them. In another embodiment of the present invention, the apparatus of the present invention identifies the Rate ⅛ voice frame packets and selects some of them for further transmission. In both embodiments the efficiency of channel utilization is increased since the amount of channel band width used to communicate relatively little information, e.g., gaps of silence, is decreased.

8 Claims, 7 Drawing Sheets

U.S. PATENT DOCUMENTS

| | | | |
|---|---|---|---|
| 6,697,353 B2* | 2/2004 | Bharucha et al. | 370/352 |
| 6,879,581 B1* | 4/2005 | Leung | 370/352 |
| 7,386,327 B2* | 6/2008 | Ryu et al. | 455/570 |
| 2001/0043577 A1* | 11/2001 | Barany et al. | 370/328 |
| 2002/0101844 A1* | 8/2002 | El-Maleh et al. | 370/342 |
| 2002/0118650 A1 | 8/2002 | Jagadeesan et al. | 370/260 |
| 2002/0196743 A1* | 12/2002 | Thalanany et al. | 370/252 |
| 2003/0039259 A1* | 2/2003 | Madour | 370/401 |
| 2003/0133408 A1* | 7/2003 | Cheng et al. | 370/230 |
| 2004/0047366 A1* | 3/2004 | Chowdhury | 370/466 |
| 2004/0081133 A1* | 4/2004 | Smavatkul et al. | 370/346 |
| 2004/0160979 A1* | 8/2004 | Pepin et al. | 370/462 |
| 2005/0265284 A1* | 12/2005 | Hsu et al. | 370/331 |
| 2005/0286536 A1* | 12/2005 | Steinheider et al. | 370/395.52 |
| 2006/0062177 A1* | 3/2006 | Asthana et al. | 370/328 |

OTHER PUBLICATIONS

"Physical Layer Standard for cdma2000 Spread Spectrum Systems, Release C", 3GPP2 standard specification, C.S0002-C v1.0, May 28, 2002.

"Enhanced Variable Rate Codec (EVRC)", 3GPP2 standard specification, C.S0014-0 v1.0, Dec. 1999.

"Link-Layer Assisted Robust Header Compression Service Options for Voice-over-IP Operation", 3GPP2 standard specification, 3GPP2 S.P9021 v0.1, Sep. 3, 2002.

"Robust Header Compression (ROHC): Framework and four profiles: RTP, UDP, ESP and uncompressed", C. Burmeister et al., RFC 3095, Jul. 2001.

"Robust Header Compression (ROHC): A Link-Layer Assisted Profile for IP/UDP/RTP", L-E. Jonsson et al., Apr. 2002.

* cited by examiner

APPARATUS AND METHOD FOR EFFICIENTLY SUPPORTING VOIP IN A WIRELESS COMMUNICATION SYSTEM

TECHNICAL FIELD

The present invention concerns apparatus and method for use in supporting Voice over Internet Protocol ("VoIP") service in wireless telecommunications systems and more particularly concerns methods for encoding speech so that bandwidth in wireless telecommunications systems is used more efficiently.

BACKGROUND OF THE INVENTION

In communication systems there is a never-ending search to increase the efficiency of utilization of communication system assets. A typical problem in voice-based communication systems is to increase the number of conversations that can be carried in the same bandwidth. The solution to this problem has been approached from a number of different perspectives. In one such well-known solution, information theory is used to assign short symbols to encode more frequently occurring aspects of speech and relatively longer symbols to encode less frequently occurring aspects. By efficiently coding speech, more conversations can be carried in a given bandwidth.

Similar concerns have been encountered in new voice-based communications environment—Voice over Internet Protocol ("VoIP") service. This invention applies to the operations of VoIP on Forward Packet Data Channel ("F-PDCH") in CDMA2000 1xEV-DV ("1x Evolution for Data and Voice") systems. In 1xEV-DV, the F-PDCH encoder packet (EP) size can be one of the seven possible values: 216, 408, 792, 1560, 2383, 3096, or 3864 bits. The voice payload, on the other hand, is much smaller than the EP size. For example, the Enhanced Variable Rate Codec (EVRC) produces 171, 80 and 16 bits per 20 ms for rate 1, rate ½, and rate ⅛, respectively. Active speech is encoded at rate 1 or rate ½, and background noise is encoded at rate ⅛. Typically rate ⅛ is used for about 60% of the time during a conversation due to the nature of speech in which there are frequent gaps of background noise which, when taken together, comprise a relatively large part of speech. Comparing the voice payload to the EP size, it is obvious that transmission of rate ⅛ VoIP packets on the F-PDCH is extremely inefficient, wasting a large portion of the system resources while providing minor gain to the voice quality. Bundling many rate ⅛ VoIP packets into one encoder packet can improve the packing efficiency, however, doing so will increase the overall end-to-end delay of the voice communication and adversely impact the voice quality.

Thus, those skilled in the art seek improved methods and apparatus for supporting VoIP service in CDMA systems, particularly apparatus and methods that use bandwidth assets more efficiently. For example, those skilled in the art seek apparatus and methods that take into consideration the fact that a large portion of speech comprises gaps of background noise that convey little or no information, and thus which need not be reproduced with a high degree of fidelity, if at all.

SUMMARY OF THE INVENTION

The present invention overcomes the limitations of the prior art. A first preferred embodiment of the present invention concerns method and apparatus for use in a wireless telecommunications system that supports voice over internet protocol service. In one method associated with the present invention, the wireless telecommunications system receives VoIP packets encoding speech wherein a portion of the VoIP packets encode background noise which comprises part of the speech; the wireless telecommunications system identifies those packets which encode background noise, and discards them. In further steps, the wireless telecommunications system performs header compression on the VoIP packets not discarded and transmits them over a wireless link to a mobile unit.

In a variant of the first preferred embodiment, the wireless telecommunications system receives VoIP packets wherein a portion of the VoIP packets encode background noise which comprises part of the encoded speech; the wireless telecommunications system identifies those packets which encode background noise; and then the telecommunications system retains some of the VoIP packets encoding background noise and discards the rest.

In a further variant of the first preferred embodiment, VoIP packets encoded using Enhanced Variable Rate Codec ("EVRC") arrive at a Packet Data Serving Node ("PDSN") of a wireless telecommunications system; the PDSN identifies the packets with Rate ⅛ voice frame information; the PDSN discards all of the Rate ⅛ packets; the PDSN performs IP/UDP/RTP header compression on all the Rate 1 or Rate ½ packets; and the PDSN then forwards these packets to the Packet Control Function ("PCF") or Base Station Controller ("BSC").

In still further variants of the first preferred embodiment, the PDSN selects some of the Rate ⅛ packets for transmission; performs IP/UDP/RTP header compression on the Rate ⅛ packets selected for transmission; and forwards the selected Rate ⅛ packets to the PCF or BSC.

In a second preferred embodiment of the present invention comprising both method and apparatus, the VoIP packets arrive at the PDSN; the PDSN performs header compression on all of the packets; the PDSN forwards them to the PCF/BSC; the PCF/BSC discards all of the Rate ⅛ packets; the Rate 1 and Rate ½ packets are transmitted to the Base Transceiver System (BTS); and the BTS then delivers the VoIP packets over the forward packet data channel to the Mobile Station (MS).

In variants of the second preferred embodiment, the PCF/BSC selects some of the Rate ⅛ packets for transmission; and the PCF/BSC transmits the selected Rate ⅛ packets to the Base Transceiver System.

Thus the embodiments of the present invention efficiently support VoIP in 1 xEV-DV systems. In particular, embodiments of the present invention discard some or all VoIP data packets corresponding to gaps of background noise in speech. As a result, the system bandwidth is used more efficiently since a greater portion of the transmitted VoIP packets contain intelligible speech as opposed to background noise.

BRIEF DESCRIPTION OF THE DRAWINGS

The above and other objects and advantages of this invention will be apparent upon consideration of the following detailed description, taken in conjunction with the accompanying drawings in which like characters refer to like elements throughout and in which.

DETAILED DESCRIPTION OF THE PREFERRED EMBODIMENTS

Figure 1:
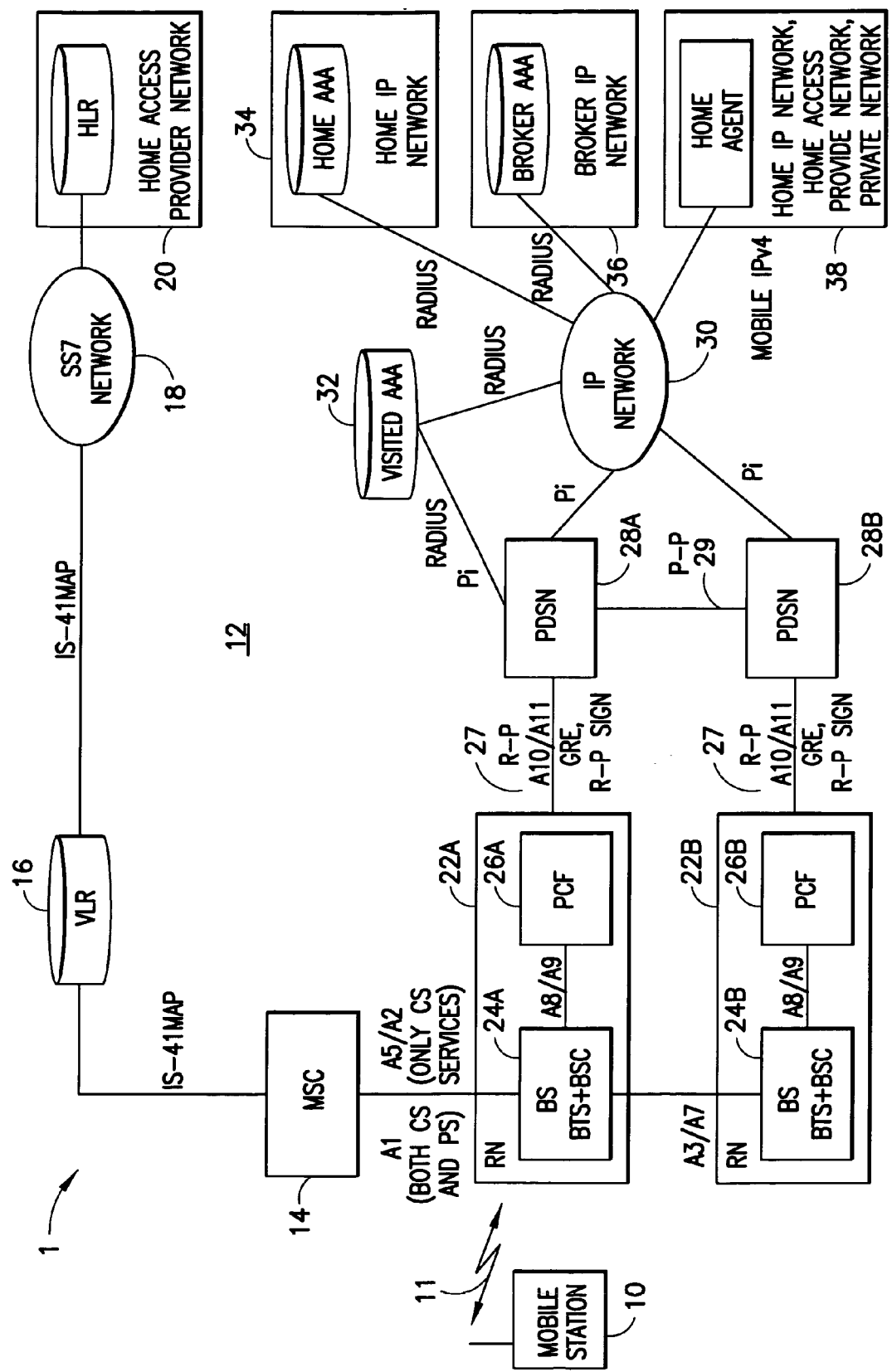
FIG. 1 depicts a simplified block diagram of a CDMA 2000 1x wireless communications network suitable for use in practicing the teachings of this invention.

FIG. 1 is simplified block diagram of a wireless communication system 1, specifically a CDMA 2000 1x network that is suitable for use in practicing the teachings of this invention. A description of FIG. 1 will be provided in order to place this invention into a suitable technological context. However, it should be appreciated that the specific network architecture and topology shown in FIG. 1 is not to be construed in a limiting sense upon this invention, as embodiments of this invention could be practiced in networks having an architecture and topology that differs from that shown in FIG. 1. Further, the general concepts of this invention may be practiced as well in a TDMA-based mobile IP network, and the invention is thus not limited for use only in a CDMA network. In general, this invention will find utility in wireless technologies that support a Voice over Internet Protocol (VoIP) functionality. As such, while reading the ensuing description it should be noted that while some aspects of the description are specific to a CDMA network, the description is not intended to be read in a limiting sense upon the implementation, use and practice of this invention.

The wireless communication system 1 shown in FIG. 1 includes at least one mobile station (MS) 10. The MS 10 may be or may include a cellular telephone, or any type of mobile terminal (MT) or mobile node (MN) having wireless communication capabilities including, but not limited to, portable computers, personal data assistants (PDAs), Internet appliances, gaming devices, imaging devices and devices having a combination of these and/or other functionalities. The MS 10 is assumed to be compatible with the physical and higher layer signal formats and protocols used by a network 12, and to be capable of being coupled with the network 12 via a wireless link 11. In the presently preferred embodiments of this invention the wireless link 11 is a radio frequency (RF) link, although in other embodiments the wireless link 11 could be an optical link.

In a conventional sense the network 12 includes a mobile switching center (MSC) 14 coupled through an IS-41 Map interface to a visitor location register (VLR) 16. The VLR 16 in turn is coupled through an IS-41 Map interface to a switching system seven (SS-7) network 18 and thence to a home location register (HLR) 20 that is associated with a home access provider network of the MS 10. The MSC 14 is also coupled through an A1 interface (for circuit switched (CS) and packet switched (PS) traffic) and through an A5/A2 interface (CS services only) to a first radio network (RN) 22A. The first RN 22A includes a base station (BS) 24A that includes a base transceiver station (BTS) and a base station center (BSC) that is coupled through an A8/A9 interface to a Packet Control Function (PCF) 26A. The PCF 26A is coupled via an R-P (PDSN/PCF) interface 27 (also called an A10/A11 interface) to a first packet data service node (PDSN) 28A and thence to an IP network 30 (via a Pi interface). The PDSN 28A is also shown coupled to a visited access, authorization and accounting (AAA) node 32 via a Pi and a remote authentication dial-in service (RADIUS) interface, that in turn is coupled to the IP network 30 via a RADIUS interface. Also shown coupled to the IP network 30 via RADIUS interfaces are a Home IP network AAA node 34 and a Broker IP network AAA node 36. A home IP network/home access provider network/private network Home Agent 38 is coupled to the IP network via a Mobile IPv4 interface. In accordance with RFC3220, the Home Agent 38 is a router on the home network of a mobile node (the MS 10 in this description) that tunnels datagrams for delivery to the mobile node when it is away from home, and that maintains current location information for the mobile node.

Also shown in FIG. 1 is a second RN 22B that is coupled to the first RN 22A via an A3/A7 interface. The second RN 22B includes a BS 24B and a PCF 26B and is coupled to a second PDSN 28B. The PDSN 28A and the PDSN 28B are coupled together through a P-P interface 29 (PDSN to PDSN interface, defined in IS835C). It should be noted that there may be a plurality of BSs 24 connected to a single PCF 26 (defining a BS subnet), and that there may be a plurality of PCFs 26 within a given network all connected to a single PDSN 28.

Figure 2:
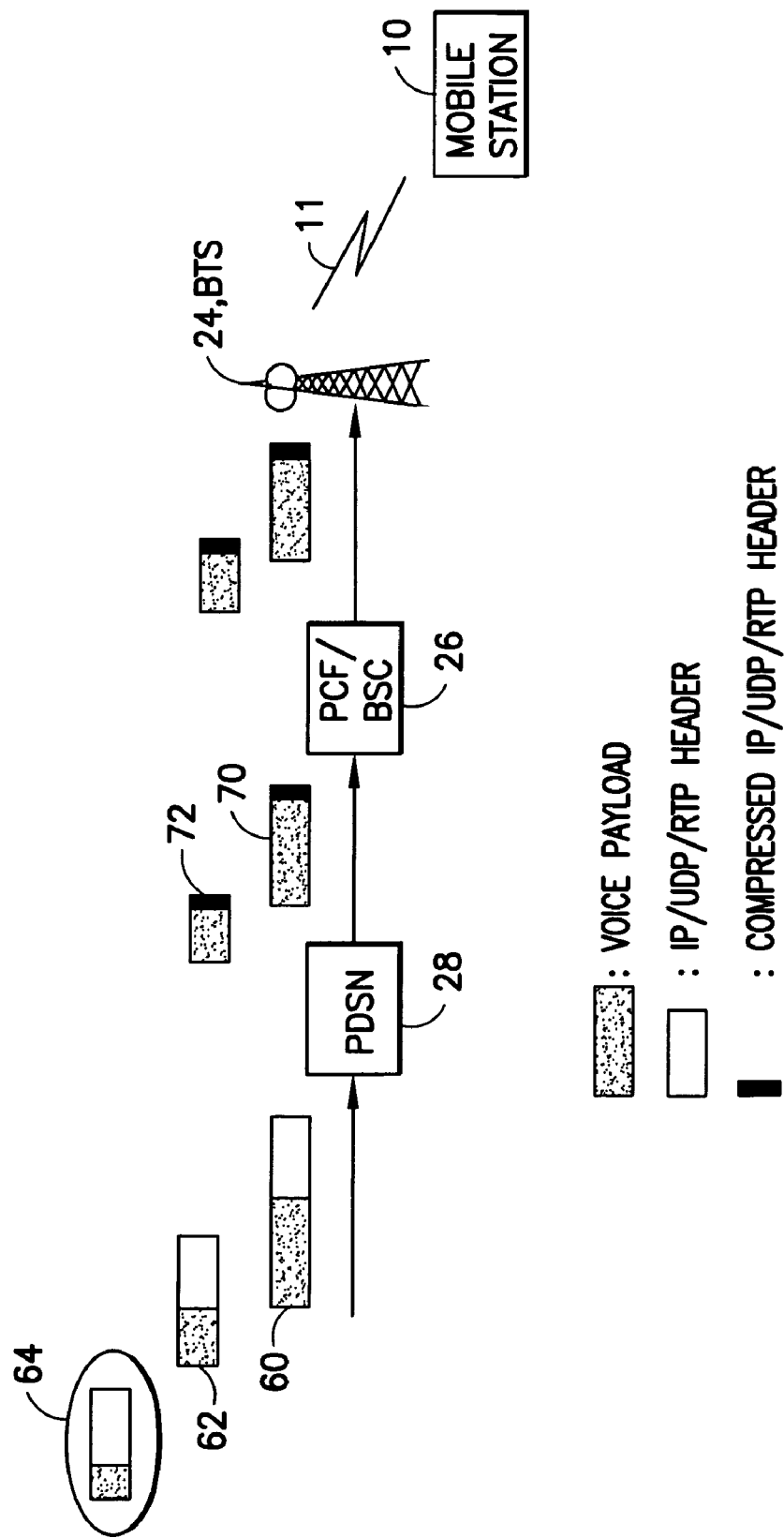
FIG. 2 depicts a conceptual block diagram of an apparatus operating in accordance with a first preferred embodiment of the present invention.
Figure 5:
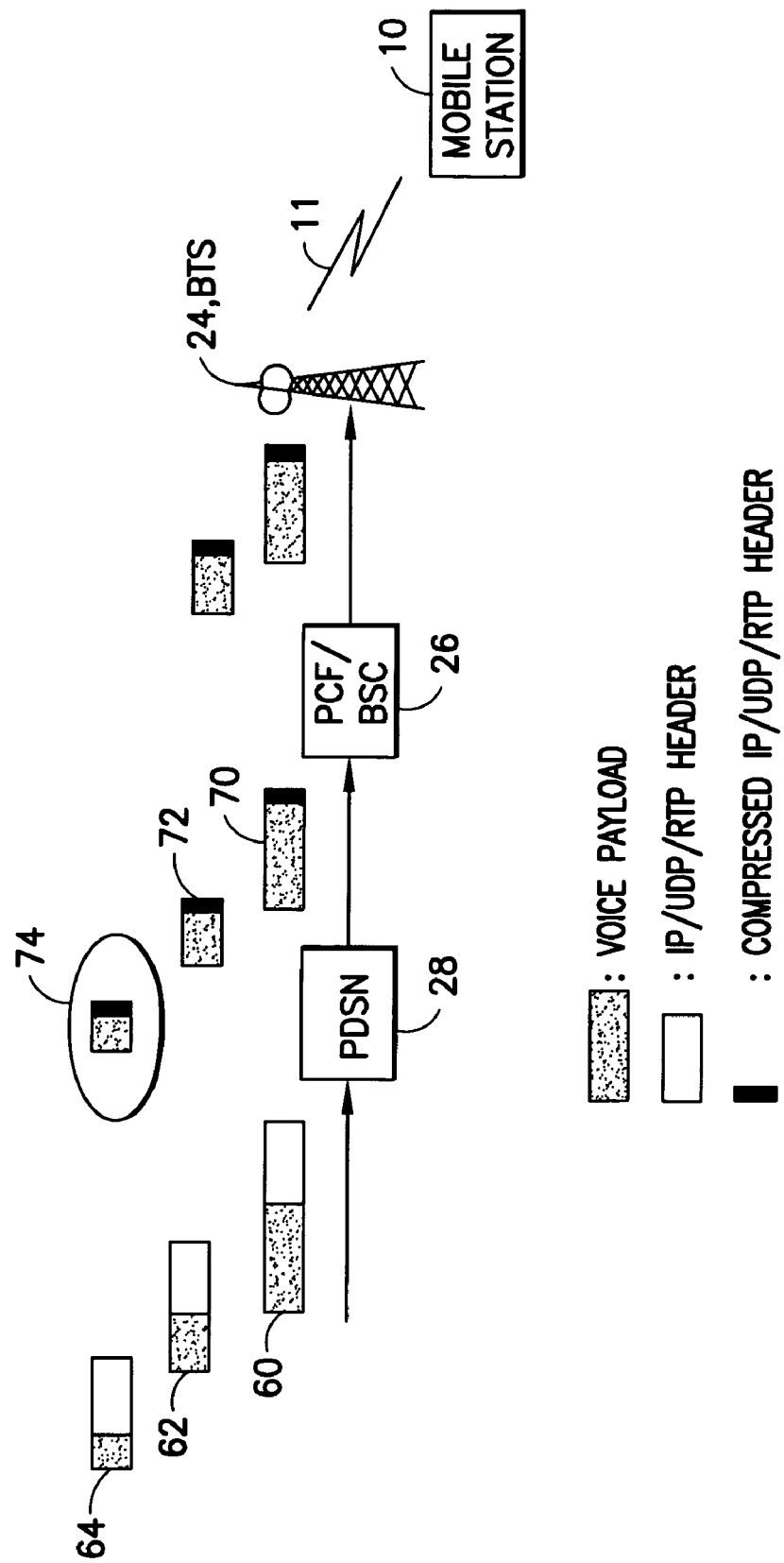
FIG. 5 depicts a conceptual block diagram of an apparatus operating in accordance with a second preferred embodiment of the present invention.

FIG. 2 depicts a system for carrying out a first preferred embodiment of the present invention. In FIGS. 2 and 5, the PDSN, PCF/BSC, and BTS are referred generically by reference characters 28, 26, and 24, respectively, to indicate that the methods and apparatus of the present invention can be practiced in systems that differ somewhat from that depicted in FIG. 1. As shown in FIG. 2, the PDSN 28 receives rate 1 voice packets 60, rate 1 voice packets 62 and rate $\frac{1}{8}$ voice packets 64 encoded using the Enhanced Variable Rate Codec ("EVRC"). Although the invention is described with reference to the EVRC codec, other voice codecs known to those skilled in the art can be used. In the first preferred embodiment, the PDSN detects those voice packets corresponding to rate $\frac{1}{8}$ voice packets 64 and discards them. The PDSN then performs header compression on the rate 1 and $\frac{1}{2}$ packets to create VoIP packets 70 and 72. The rate 1 and rate $\frac{1}{2}$ voice packets 70, 72 are then forwarded to PCF 26, and in turn to the BTS incorporated in the BS 24. The voice packets are then transmitted to the MS 10 over wireless link 11.

Figure 3:
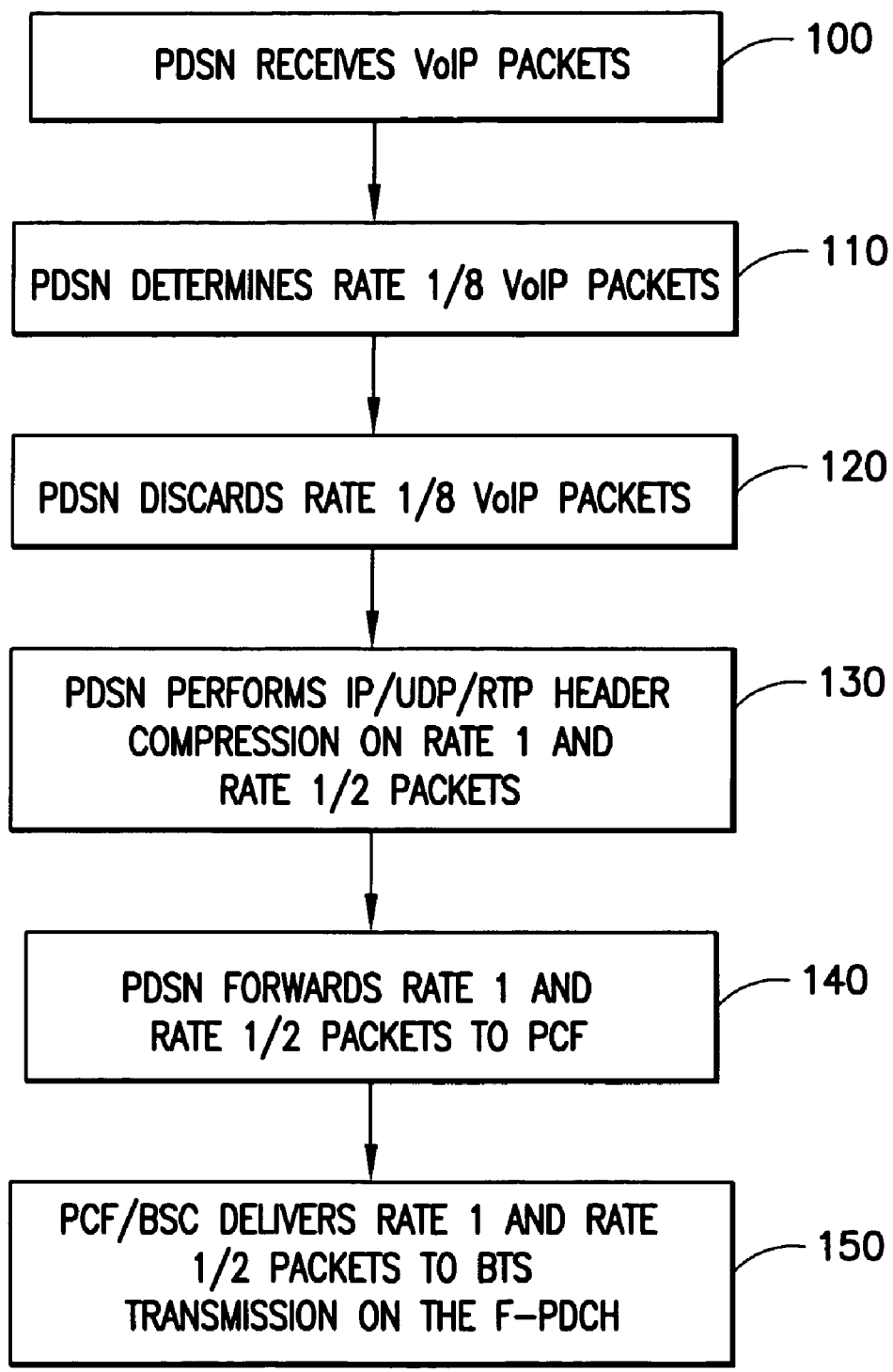
FIG. 3 depicts a flowchart illustrating the steps of a method operating in accordance with the first preferred embodiment of the present invention.

FIG. 3 depicts a flowchart illustrating the steps of a method in accordance with the first preferred embodiment of the present invention. In the method, the PDSN receives rate 1, rate $\frac{1}{2}$ and rate $\frac{1}{8}$ VoIP packets at step 100. The PDSN determines which VoIP packets correspond to rate $\frac{1}{8}$ packets at step 110, and discards them at step 120. Next the PDSN performs IP/UDP/RTP header compression on the rate 1 and rate $\frac{1}{2}$ packets at step 130, and forwards them to the PCF at step 140. Then the PCF/BSC delivers the rate 1 and rate $\frac{1}{2}$ packets to the BTS for transmission on the F-PDCH.

Figure 4:
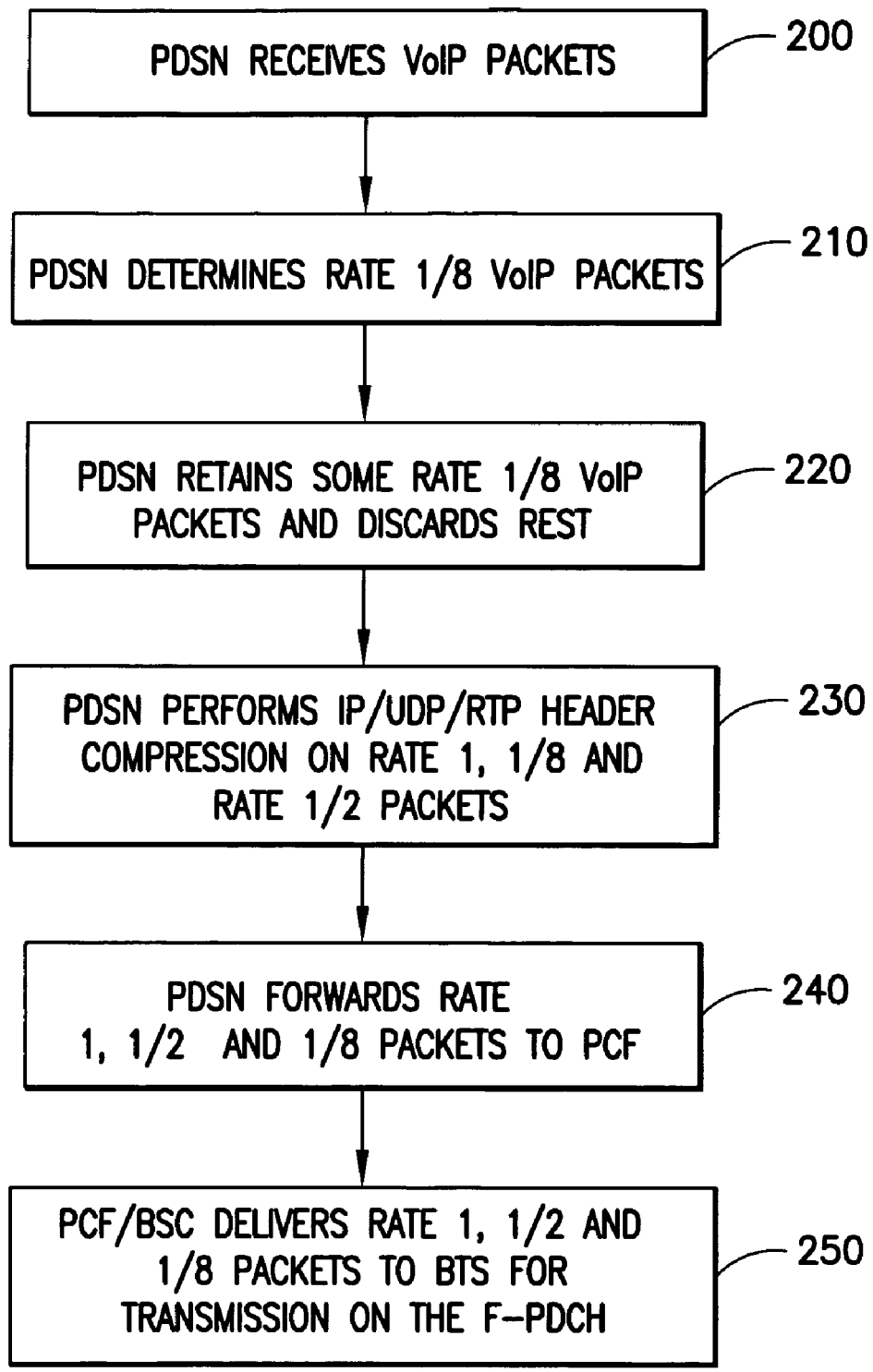
FIG. 4 depicts a flowchart illustrating the steps of an alternate method operating in accordance with the first preferred embodiment of the present invention.

FIG. 4 depicts a flowchart illustrating the steps of an alternate method in accordance with the first preferred embodiment of the present invention. At step 200, the PDSN receives VoIP packets. In step 210, the PDSN determines which VoIP packets correspond to rate $\frac{1}{8}$ packets and at step 220, the PDSN retains some of the rate $\frac{1}{8}$ VoIP packets and discards the rest. At step 230, the PDSN performs IP/UDP/RTP header compression on rate 1 and rate $\frac{1}{2}$ packets, as well as the retained rate $\frac{1}{8}$ packets. Next, at step 240, the PDSN forwards the rate 1, $\frac{1}{2}$ and retained $\frac{1}{8}$ packets to the PCF. Then at step 250, the PCF/BSC delivers the rate 1, ½ and ⅛ packets to the BTS for transmission on the F-PDCH.

FIG. 5 depicts a system for carrying out a second preferred embodiment of the present invention. As shown in FIG. 5, the PDSN 28 receives rate 1, ½ and ⅛ voice packets 60, 62 and 64, respectively, and performs header compression on all of them. The rate 1, ½ and ⅛ voice packets with compressed headers 70, 72 and 74 are then forwarded to PCF 26. The PCF 26 determines which VoIP packets corresponds to rate ⅛ packets 74 and discards them. The rate 1 and ½ voice packets 70 and 72 are then transmitted to the MS 10 over wireless link 11 by BTS 24.

Figure 6:
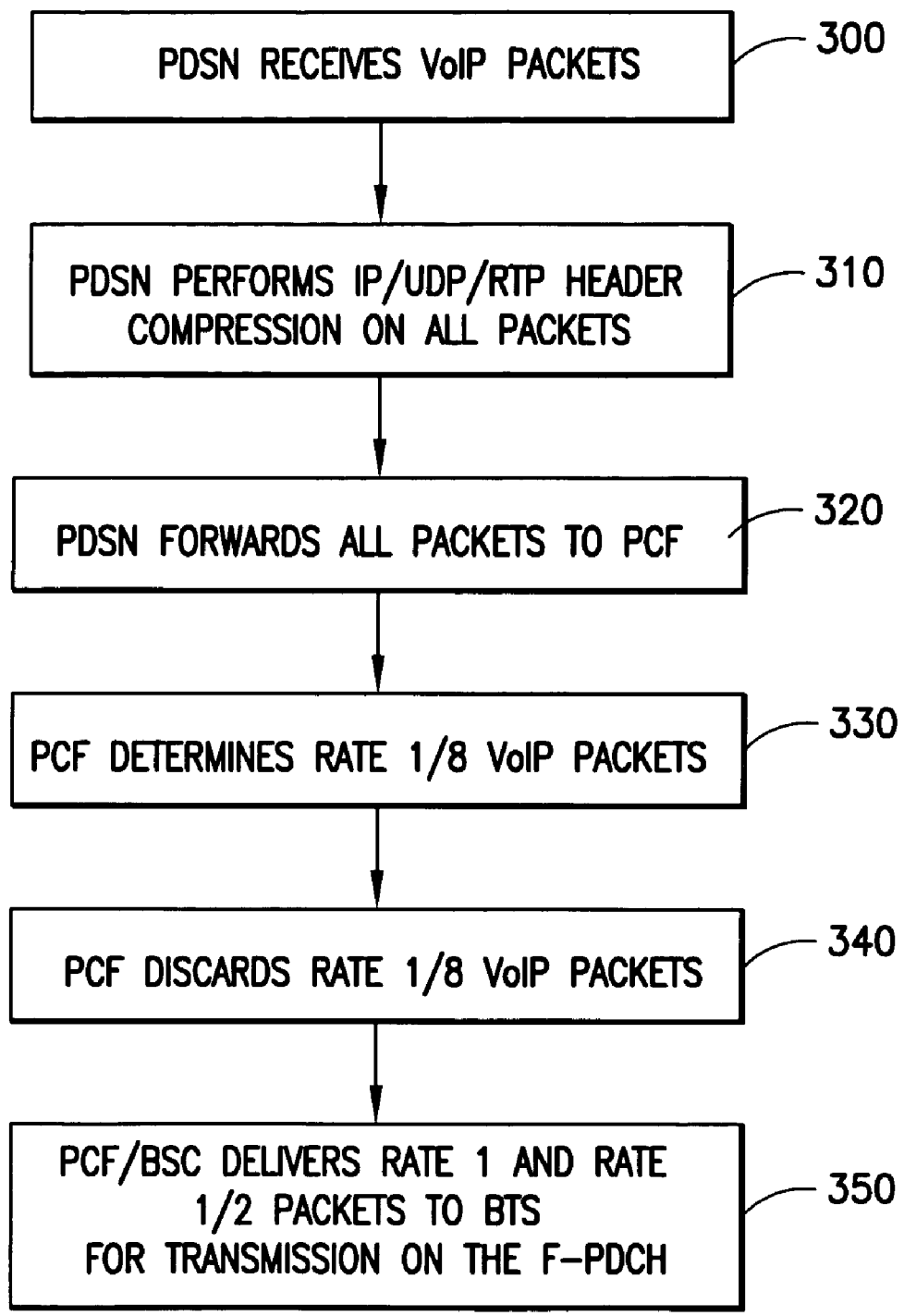
FIG. 6 depicts a flowchart illustrating the steps of a method operating in accordance with the second preferred embodiment of the present invention.

FIG. 6 depicts a flowchart illustrating the steps of a method in accordance with a second preferred embodiment of the present invention. At step 300, the PDSN receives the VoIP (including rate 1, ½ and ⅛ packets) and at step 310 performs IP/UDP/RTP header compression on all packets. Next at step 320 the PDSN forwards all packets to the PCF. The PCF at step 330 determines which packets correspond to rate ⅛ VoIP packets, and at step 340 discards them. Finally at step 350 the PCF/BSC delivers the rate 1 and ½ packets to the BTS for transmission on the F-PDCH.

Figure 7:
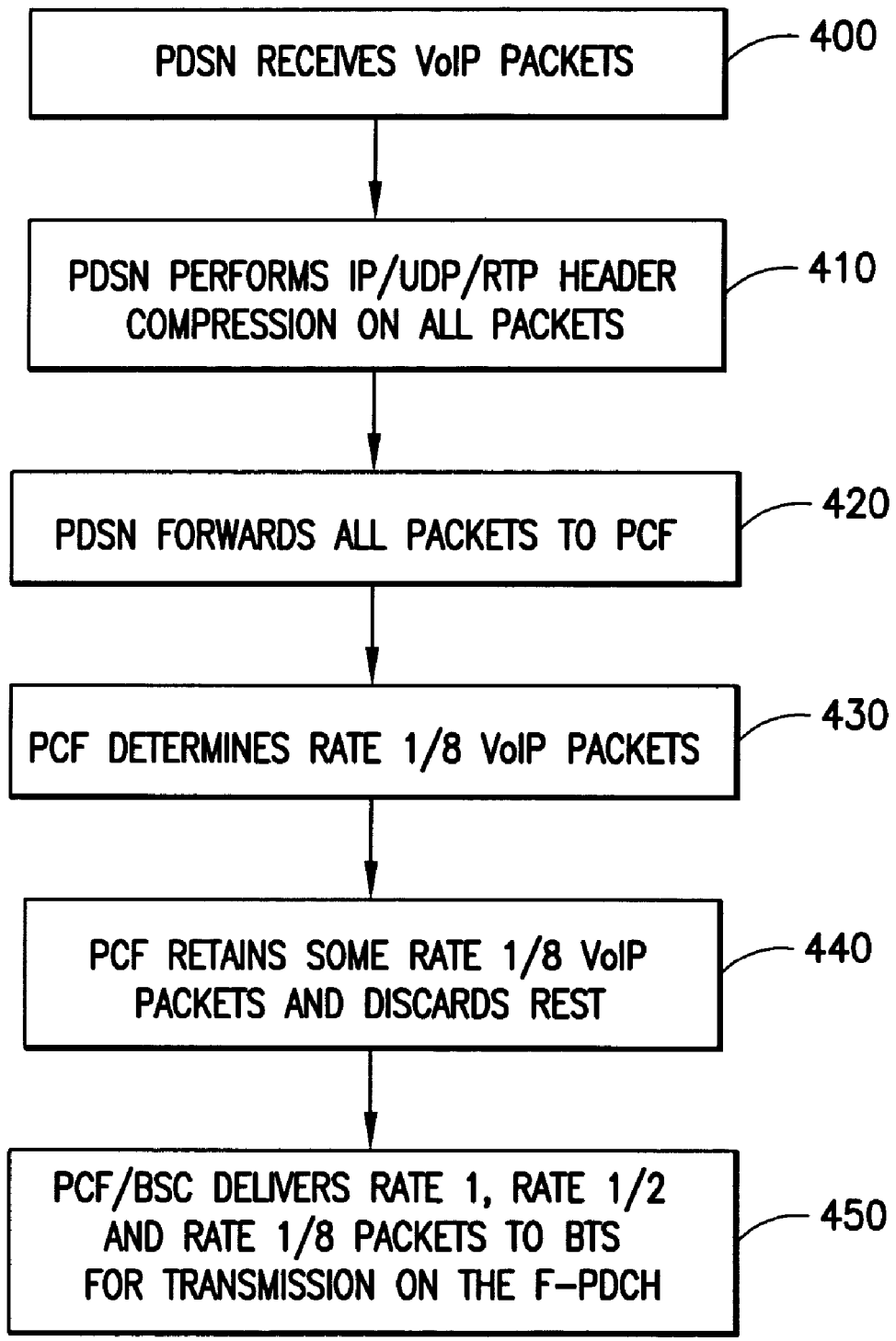
FIG. 7 depicts a flowchart illustrating the steps of an alternate method operating in accordance with the second preferred embodiment of the present invention.

FIG. 7 depicts a flowchart illustrating the steps of an alternate method in accordance with a second preferred embodiment of the present invention. At step 400, the PDSN receives rate 1, ½ and ⅛ VoIP packets. Next, the PDSN performs IP/UDP/RTP header compression on all packets at step 410. Then at step 420 the PDSN forwards all packets to the PCF. The PCF at step 430 determines which VoIP packets are rate ⅛ packets. Next at step 440 the PCF retains some of the identified rate ⅛ packets and discards the rest. Finally at step 450 the PCF/BSC delivers the rate 1 and ½ and retained rate ⅛ packets to the BTS for transmission on the F-PDCH.

An embodiment of the invention is a computer memory medium tangibly embodying a program of machine-readable instructions executable by one or more digital processing apparatus to perform operations in a wireless telecommunications system for supporting voice over interne protocol. The operations comprise: receiving VoIP packets at the packet data serving node, wherein at least one VoIP packet encode background noise associated with speech; identifying the at least one VoIP packet encoding background noise; and discarding the at least one VoIP packet.

Another embodiment of the invention is a computer memory medium tangibly embodying a program of machine-readable instructions executable by one or more digital processing apparatus to perform operations in a wireless telecommunications system for supporting voice over internet protocol. The operations comprise: receiving VoIP packets at the packet data serving node, wherein a portion of the VoIP packets encode background noise associated with human speech; identifying the VoIP packets encoding background noise; retaining some VoIP packets encoding background noise; and discarding the remaining VoIP packets encoding background noise.

A further embodiment of the invention is a computer memory medium tangibly embodying a program of machine-readable instructions executable by one or more digital processing apparatus to perform operations in a wireless telecommunications system for supporting voice over internet protocol. The operations comprise: receiving VoIP packets at the packet data serving node, wherein at least one of the VoIP packets encode background noise associated with human speech; performing header compression on the VoIP packets; transmitting the VoIP packets to the packet control function; receiving the VoIP packets at the packet control function; identifying the at least one VoIP packet encoding background noise; and discarding the at least one VoIP packets.

Yet another embodiment of the invention is a computer memory medium tangibly embodying a program of machine-readable instructions executable by one or more digital processing apparatus to perform operations in a wireless telecommunications system for supporting voice over interne protocol. The operations comprise: receiving VoIP packets at the packet data serving node, wherein a portion of the VoIP packets encode background noise associated with speech; performing header compression on the VoIP packets; transmitting the rate VoIP packets with compressed headers to the packet control function; receiving the VoIP packets at the packet control function; identifying the VoIP packets encoding background noise; retaining some VoIP packets encoding background noise; and discarding the remaining VoIP packets encoding background noise.

Thus it is seen that a apparatus and method for efficiently supporting VoIP in a wireless communication system are provided by the present invention. One skilled in the art will understand that the present teachings can be applied to other wireless communications systems besides those based on CDMA principles. In addition, the VoIP packets can be encoded with other codecs besides EVRC known to those skilled in the art. Accordingly, one skilled in the art will appreciate that the present invention can be practiced by other than the described embodiments; that these described embodiments are presented for the purposes of illustration and not of limitation; and that the present invention is therefore limited only by the claims which follow.

We claim:

1. An apparatus comprising:
a packet data serving node; and
a packet control function,
the packet data serving node comprising:
a receiver configured to receive voice over internet protocol packets, wherein a portion of the voice over internet protocol packets encode background noise that occurs during speech and another portion of the voice over internet protocol packets encode speech;
a header compressor configured to compress the headers of the voice over internet protocol packets; and
a voice over internet protocol packet forwarder configured to forward the voice over internet protocol packets with compressed headers to the packet control function;
the packet control function
configured to receive voice over internet protocol packets from the packet data serving node;
configured to identify which voice over internet protocol packets encode background noise and which voice over internet protocol packets encode speech; and
configured to discard all the voice over internet protocol packets encoding background noise; and
wherein the apparatus is configured to reduce downlink bandwidth requirements associated with a voice over internet protocol service by discarding the voice over internet protocol packets encoding background noise.

2. An apparatus comprising:
a packet data serving node; and
a packet control function,
the packet data serving node comprising:
a receiver configured to receive voice over internet protocol packets, wherein a portion of the voice over internet protocol packets encode background noise that occurs during speech and another portion of the voice over internet protocol packets encode speech;

a header compressor configured to compress the headers of the voice over internet protocol packets; and a voice over internet protocol packet forwarder configured to forward the voice over internet protocol packets with compressed headers to the packet control function;

the packet control function configured to receive voice over internet protocol packets from the packet data serving node;

configured to identify which voice over internet protocol packets encode background noise and which voice over internet protocol packets encode speech; and configured to retain some of the voice over internet protocol packets encoding background noise and to discard the remaining voice over internet protocol packets encoding background noise; and wherein the apparatus is configured to reduce downlink bandwidth requirements associated with a voice over internet protocol service by discarding the voice over internet protocol packets encoding background noise.

3. A method comprising:

in a wireless telecommunication system supporting voice over internet protocol service, reducing downlink bandwidth requirements associated with the voice over internet protocol service by:

receiving voice over internet protocol packets encoded using an enhanced variable rate codec at a packet data serving node, wherein the voice over internet protocol packets comprise at least rate 1, ½ and ⅛ packets, and wherein the rate ⅛ packets encode background noise associated with speech;

performing header compression on the rate 1, ½ and ⅛ packets at the packet data serving node;

transmitting the rate 1, ½ and ⅛ packets from the packet data serving node to a packet control function of a radio network;

receiving the voice over internet protocol packets at the packet control function;

identifying the rate ⅛ packets at the packet control function; and discarding the rate ⅛ packets and retaining the rate 1 and rate ½ voice frame packets at the packet control function.

4. A method comprising:

in a wireless telecommunications system supporting voice over internet protocol service, reducing downlink bandwidth requirements associated with the voice over internet protocol service by:

receiving voice over internet protocol packets encoded using an enhanced variable rate codec at a packet data serving node, wherein the voice over internet protocol packets comprise at least rate 1, ½ and ⅛ packets, and wherein the rate ⅛ packets encode background noise associated with speech;

performing header compression on the rate 1, ½ and ⅛ packets at the packet data serving node;

transmitting the rate 1, ½ and ⅛ packets from the packet data serving node to a packet control function of a radio network;

receiving the voice over internet protocol packets at the packet control function;

identifying the rate ⅛ packets at the packet control function;

retaining some rate ⅛ voice frame packets via the packet control function; and discarding the remaining rate ⅛ voice frame packets and retaining the rate 1 and rate ½ voice frame packets via the packet control function.

5. An apparatus comprising:

a packet data serving node configured to receive voice over internet protocol packets encoded using an enhanced variable rate codec comprising at least rate 1, ½ and ⅛ packets, wherein the rate ⅛ packets encode background noise associated with speech;

configured to identify which packets correspond to rate ⅛ packets; and configured to discard all rate ⅛ packets, and configured to forward the rate 1 and ½ packets with compressed headers to a packet control function of a code division multiple access wireless system, wherein the apparatus is operative in a wireless communication system to reduce downlink bandwidth requirements associated with the voice over internet protocol service by discarding the rate ⅛ packets and retaining the rate 1 and rate ½ voice frame packets.

6. The apparatus of claim 5, the packet data serving node further configured to perform header compression on the rate 1 and ½ packets.

7. A computer memory medium tangibly embodying a program of machine-readable instructions executable by one or more digital processing apparatus to perform operations in a wireless telecommunications system for supporting voice over internet protocol, the operations comprising:

receiving voice over internet protocol packets at a packet data serving node, wherein at least one of the voice over internet protocol packets encode background noise associated with human speech and at least one other of the voice over internet protocol packets encode human speech;

performing header compression on the voice over internet protocol packets at the packet data serving node;

transmitting the voice over internet protocol packets from the packet data serving node to the packet control function;

receiving the voice over internet protocol packets at the packet control function;

identifying, at the packet control function, the at least one voice over internet protocol packet encoding background noise; and discarding, via the packet control function, the at least one voice over internet protocol packets encoding background noise associated with human speech and the at least one other of the voice over internet protocol packets encoding human speech, wherein the operations reduce downlink bandwidth requirements associated with the voice over internet protocol service by discarding the at least one voice over internet protocol packet.

8. A computer memory medium tangibly embodying a program of machine-readable instructions executable by one or more digital processing apparatus to perform operations in a wireless telecommunications system for supporting voice over internet protocol, the operations comprising:

receiving voice over internet protocol packets at a packet data serving node, wherein a portion of the voice over internet protocol packets encode background noise associated with speech and another portion of the voice over internet protocol packets encode speech;

performing header compression on the voice over internet protocol packets at the packet data serving node;

transmitting the rate voice over internet protocol packets with compressed headers from the packet data serving node to the packet control function;

receiving the voice over internet protocol packets at the packet control function;

identifying, at the packet control function, the voice over internet protocol packets encoding background noise;

retaining some voice over internet protocol packets encoding background noise; and discarding, via the packet control function, the remaining voice over internet protocol packets encoding background noise, wherein the operations reduce downlink bandwidth requirements associated with the voice over internet protocol service by discarding the remaining voice over internet protocol packets encoding background noise and retaining the voice over internet protocol packets encoding speech.

\* \* \* \* \*